(12) United States Patent
Salmon et al.

(10) Patent No.: US 9,797,180 B2
(45) Date of Patent: Oct. 24, 2017

(54) DECOUPLABLE POWER DRIVE FOR TAILGATES

(71) Applicant: Multimatic Inc., Markham (CA)

(72) Inventors: John Salmon, North York (CA);
Andrew R. Daniels, Sharon (CA);
Muamer Hodza, Etobicoke (CA)

(73) Assignee: MULTIMATIC INC., Markham, Ontario (CA)

( * ) Notice: Subject to any disclaimer, the term of this patent is extended or adjusted under 35 U.S.C. 154(b) by 0 days.

(21) Appl. No.: 14/649,243

(22) PCT Filed: Dec. 6, 2013

(86) PCT No.: PCT/CA2013/050937
§ 371 (c)(1),
(2) Date: Jun. 3, 2015

(87) PCT Pub. No.: WO2014/085932
PCT Pub. Date: Jun. 12, 2014

(65) Prior Publication Data
US 2015/0315837 A1  Nov. 5, 2015

(30) Foreign Application Priority Data
Dec. 7, 2012 (CA) ..................... 2798237

(51) Int. Cl.
*B62D 33/033* (2006.01)
*E05F 15/614* (2015.01)
(Continued)

(52) U.S. Cl.
CPC ........ *E05F 15/614* (2015.01); *B62D 33/0273* (2013.01); *B62D 33/033* (2013.01);
(Continued)

(58) Field of Classification Search
CPC ........... E05F 15/614; E05F 15/40; E05F 5/00; B62D 33/0273; B62D 33/033;
(Continued)

(56) References Cited

U.S. PATENT DOCUMENTS

| 2,893,727 A | 7/1959 | Barnard |
| 6,217,097 B1 | 4/2001 | Rogers, Jr. et al. |

(Continued)

FOREIGN PATENT DOCUMENTS

| CN | 100507777 C | 7/2009 |
| DE | 102005020308 A1 | 11/2006 |

(Continued)

OTHER PUBLICATIONS

PCT International Search Report dated Mar. 5, 2014 for Intl. App. No. PCT/CA2013/050937, from which the instant application is based, 3 pgs.

(Continued)

*Primary Examiner* — Joseph D Pape
*Assistant Examiner* — Dana Ivey
(74) *Attorney, Agent, or Firm* — Fredrikson & Byron, P.A.

(57) ABSTRACT

A control device is used to move a pick-up truck tailgate. The control device comprises a first gear arrangement connected to a drive cup and a second gear arrangement that is connected to a motor for driving the second gear arrangement. The control device also includes a clutch arrangement positioned between the first and second gear arrangements. When the clutch arrangement is in an engaged position, it couples the first gear arrangement and the second gear arrangement to transmit torque to the first gear arrangement and the drive cup. When the clutch arrangement is in the disengaged position, the first and second gear arrangements are not coupled. Optionally, the control device comprises a (Continued)

brake unit to slow or stop movement of the tailgate. The control device can be positioned within the pick-up truck tailgate.

9 Claims, 8 Drawing Sheets

(51) Int. Cl.
| | |
|---|---|
| *B62D 33/027* | (2006.01) |
| *E05F 5/00* | (2017.01) |
| *E05F 15/40* | (2015.01) |
| *E05D 7/10* | (2006.01) |

(52) U.S. Cl.
CPC .............. *E05F 5/00* (2013.01); *E05D 7/1066* (2013.01); *E05F 15/40* (2015.01); *E05Y 2201/21* (2013.01); *E05Y 2201/216* (2013.01); *E05Y 2201/266* (2013.01); *E05Y 2201/434* (2013.01); *E05Y 2600/41* (2013.01); *E05Y 2600/46* (2013.01); *E05Y 2800/11* (2013.01); *E05Y 2800/232* (2013.01); *E05Y 2800/234* (2013.01); *E05Y 2900/544* (2013.01); *Y10T 74/19614* (2015.01); *Y10T 74/19637* (2015.01)

(58) Field of Classification Search
CPC ......... Y10T 74/19637; Y10T 74/19614; E05Y 2900/544; E05Y 2800/234; E05Y 2800/11; E05Y 2800/232; E05Y 2201/21; E05Y 2201/216; E05Y 2201/266; E05Y 2201/434; E05Y 2600/41; E05Y 2600/46; E05D 7/1066
USPC ........................................................ 296/50
See application file for complete search history.

(56) References Cited

U.S. PATENT DOCUMENTS

| | | | |
|---|---|---|---|
| 7,248,011 | B2 | 7/2007 | Schachtl |
| 7,654,600 | B2 * | 2/2010 | Stratten .............. B62D 33/0273 296/50 |
| 7,695,043 | B2 | 4/2010 | Zagoroff |
| 2006/0289821 | A1 | 12/2006 | Ritter |
| 2007/0132264 | A1 | 6/2007 | Koneval et al. |

FOREIGN PATENT DOCUMENTS

| | | |
|---|---|---|
| JP | S61-71771 U | 5/1986 |
| JP | H06-24181 U | 3/1994 |
| JP | H06-28160 U | 4/1994 |
| WO | 2005086958 A2 | 9/2005 |

OTHER PUBLICATIONS

European Patent Application No. 13860066.3, Extended European Search Report mailed Jun. 8, 2016, 7 pages.
International Patent Application No. PCT/CA2013/050937, International Preliminary Report on Patentability mailed Jun. 9, 2015, 7 pages.

\* cited by examiner

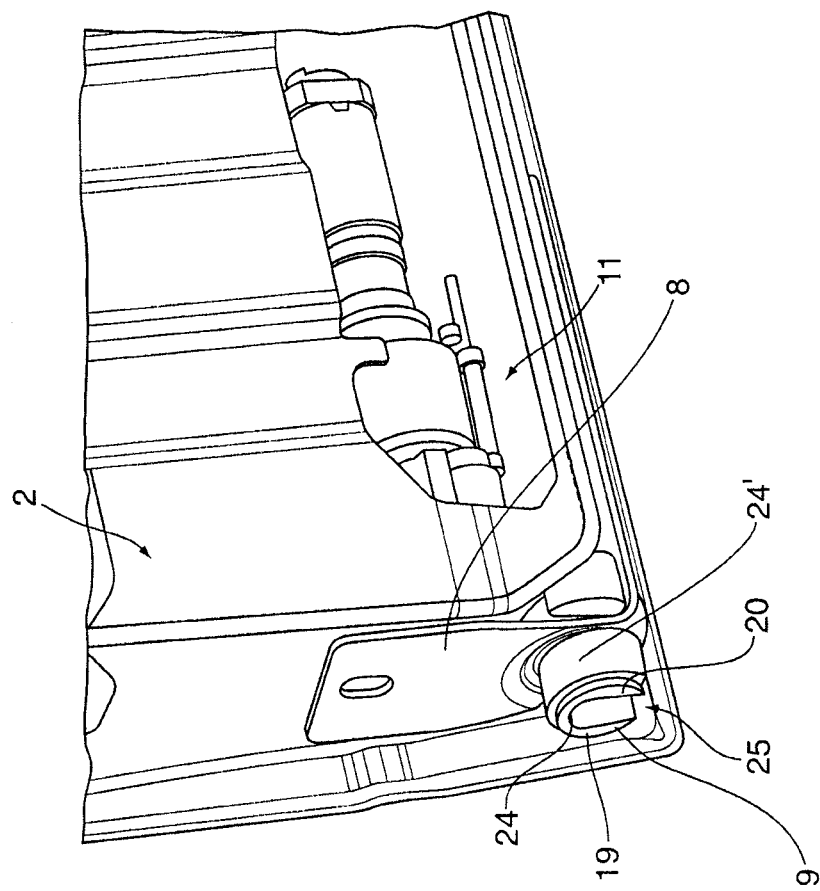
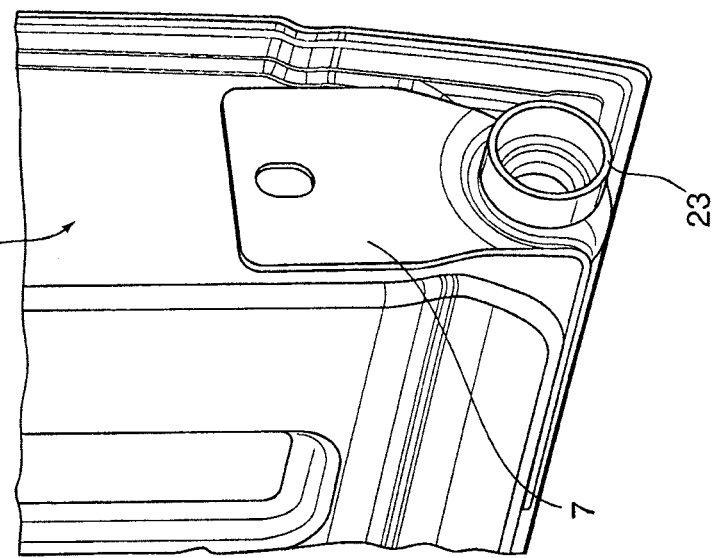

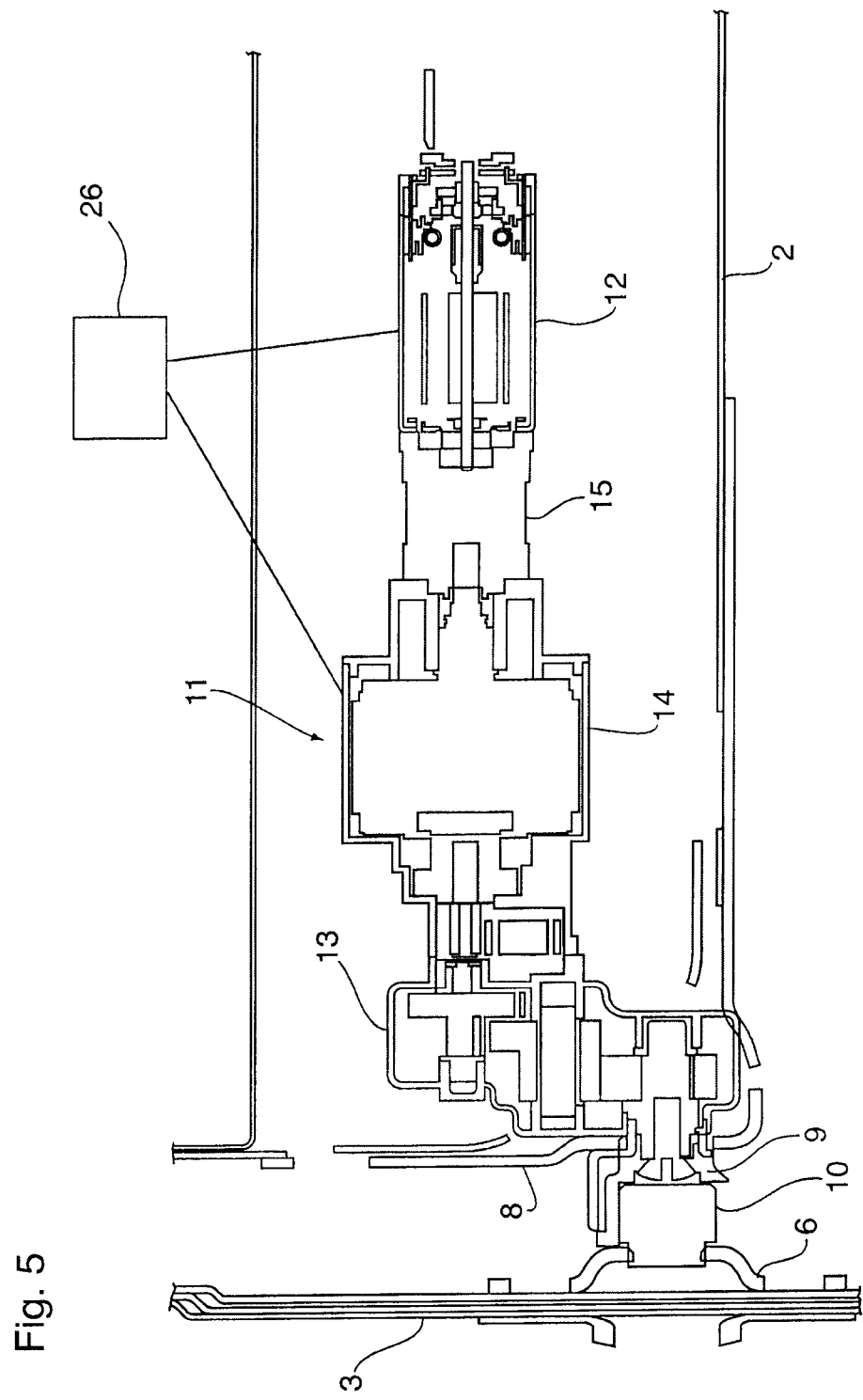

DECOUPLABLE POWER DRIVE FOR TAILGATES

RELATED APPLICATIONS

This application is a 35 U.S.C. 371 national stage filing from International Application No. PCT/CA2013/050937, filed Dec. 6, 2013, and claims priority to Canadian Application No. 2798237, filed Dec. 7, 2012, the teachings of each of which are incorporated herein by reference.

FIELD

This disclosure relates to pick-up truck tailgates and to control devices for pick-up truck tailgates.

BACKGROUND

There is a trend for motor vehicles of larger sizes. In particular, larger pick-up trucks are popular with consumers. The increased size of the pick-up truck results in larger components, including larger tailgates. The larger tail-gates are heavier and higher up off the ground than smaller motor vehicles, which can cause difficulty for some users to operate the tail-gate.

SUMMARY OF THE INVENTION

A control device for vehicle tailgates is described in this specification. The control device comprises a first gear arrangement that is connected to a drive receptacle, preferably a cup, and a second gear arrangement that is connected to a motor for driving the second gear arrangement. The drive cup is releasably connectable to a truck box of the vehicle. The control device also includes a clutch arrangement positioned between the first and second gear arrangements. The clutch arrangement is connected to the second gear arrangement and it can move between an engaged position and a disengaged position. When the clutch arrangement is in the engaged position, it engages the first gear arrangement and couples the first and second gear arrangements so that torque acting on the second gear arrangement can be transmitted to the first gear arrangement and the drive cup. When the clutch arrangement is in the disengaged position, the first and second gear arrangements are not coupled.

A variation of the control device is also described in this specification. The variant control device comprises a gear arrangement that is connected to a drive cup, a clutch arrangement and a brake unit. The drive cup is releasably connectable to a truck box of the vehicle. The clutch arrangement is connected to the gear arrangement and is moveable between an engaged position and a disengaged position. While in the engaged position the clutch arrangement couples the first gear arrangement with the brake unit. While the clutch is in the disengaged position, the gear arrangement and the brake unit are not coupled.

Preferably, the control device and the variant control device are positioned within a pick-up truck tailgate.

Optionally the control device and the variant control device may further comprise a rotary damper. The rotary damper controls the speed at which the tailgate can be manually opened when the clutch assembly is in the disengaged position. Controlling the manual opening speed of the vehicle tailgate may reduce an impact force that is generated when the tailgate swings to a fully open position. Typically, one or more cables connect the vehicle's truck box and the tailgate to hold the tailgate in the fully open position. Limiting the manual opening speed of the tailgate may allow the one or more cables to be of a smaller size, lower mass and acquired, or produced, at a lower cost. The rotary damper may also provide a smooth movement when the tailgate is manually opened.

BRIEF DESCRIPTION OF THE DRAWINGS

FIGS. 4A and 4B are schematic diagrams of two outer side walls of the tailgate of FIG. 1.

FIG. 5 is a schematic side-view diagram of an example control device for use with the truck box and tailgate of FIG. 1.

DETAILED DESCRIPTION

Figure 1:
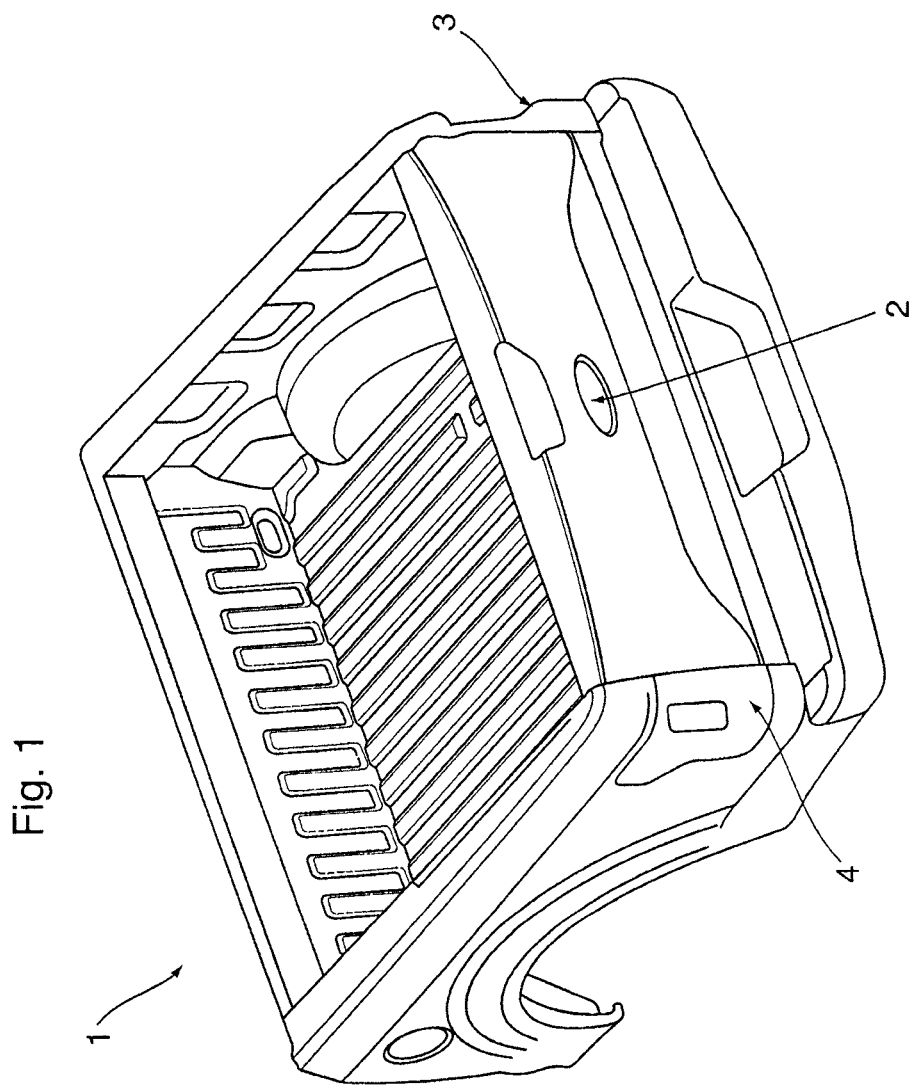
FIG. 1 is a schematic diagram of a truck box and a tailgate for use with a pick-up truck.
Figure 2:
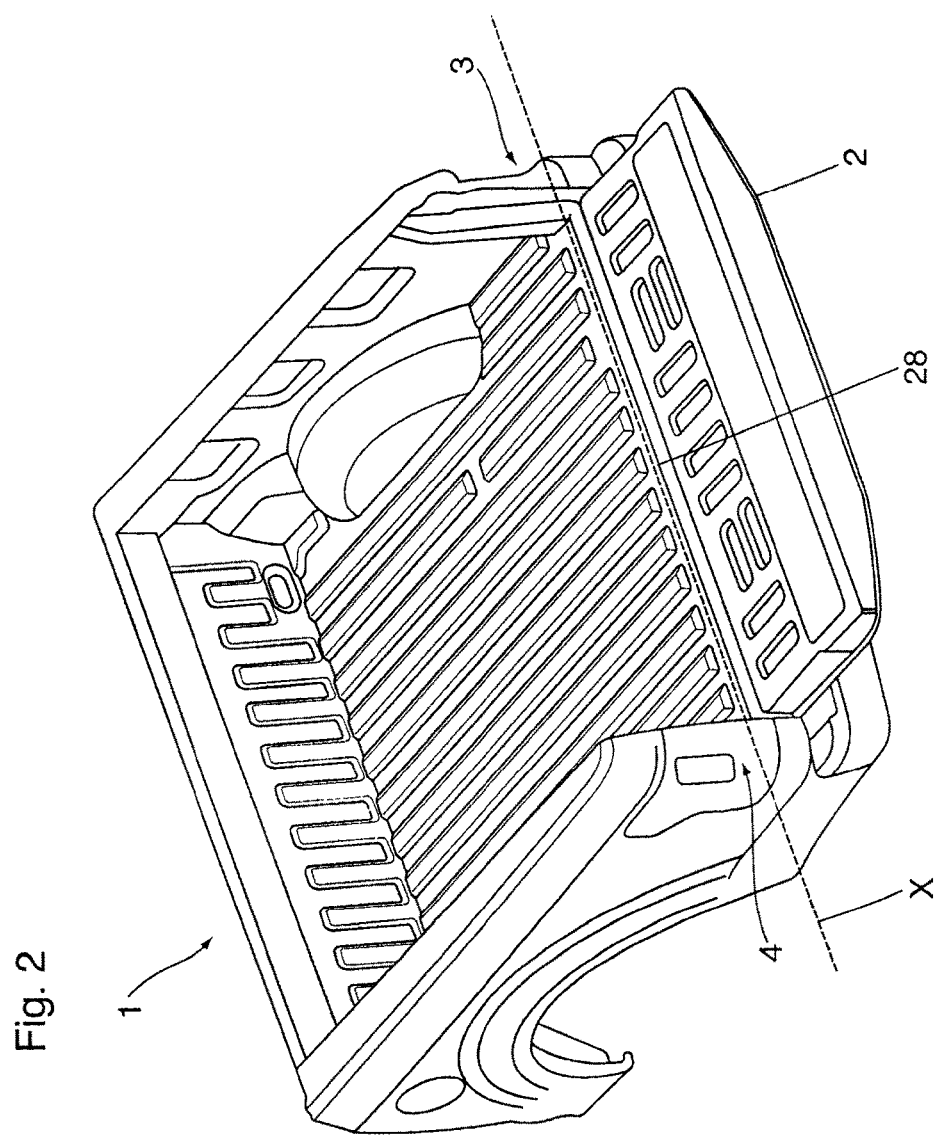
FIG. 2 is a schematic diagram of the truck box of FIG. 1, with the tailgate shown in an open position.

FIG. 1 depicts a rear end of a pick-up truck, including a truck box 1 with a tailgate 2 in a closed position. The truck box 1 has two D-pillars 3, 4 positioned at the end of, and on both sides of, the truck box 1. FIG. 2 depicts the truck box 1, with the tailgate 2 in an open position. The tailgate 2 is pivotally connected to the truck box 1 by a hinge positioned in a lower portion of the D-pillars 3, 4. The hinge comprises two male portions 5, 6 (see FIGS. 3A and 3B) and two female portions 7, 8 (see FIGS. 4A and 4B). In particular, the male portion 6 may be referred to as the male drive portion 6 and the female portion 8 may be referred to as the female drive portion 8. The two male portions 5, 6 may be fixed to a lower portion of inner side edges of the D-pillars 3, 4. The two female portions 7, 8 may be fixed to a lower portion of outer side walls of the tailgate 2. Optionally, these positions may be reversed.

Figure 3A:
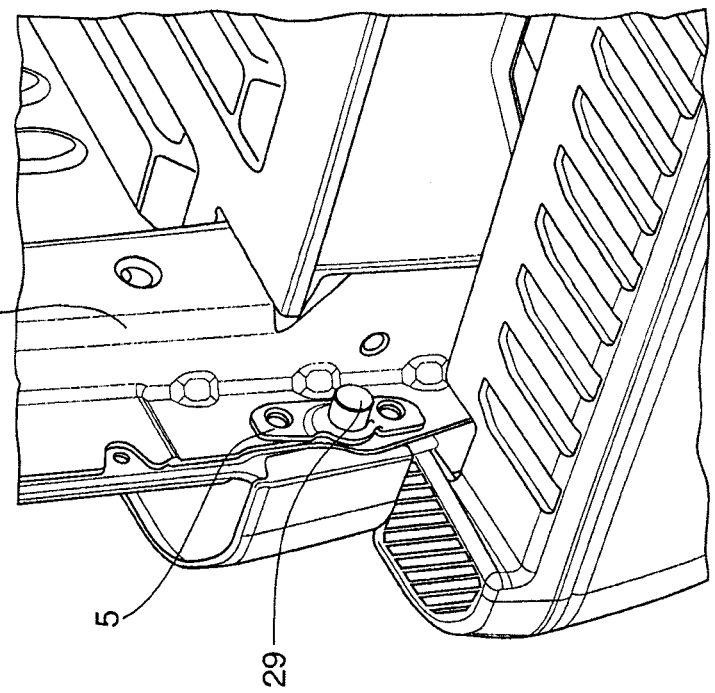
FIGS. 3A and 3B are schematic diagrams of two inner surfaces of a D-pillar in the truck box of FIG. 1.

FIG. 3A depicts the male portion 5 affixed to the D-pillar 3. The tailgate 2 is not shown in this view. The male portion 5 includes a flat body that provides a contact surface with the D-pillar 3. The male portion 5 also includes a circular arm 29 that extends away from the flat body. FIG. 4A depicts the female portion 7 affixed to the outer side wall of the tailgate 2. The female portion 7 includes a flat body that provides a contact surface with the sidewall of the tailgate 2. The female portion 7 has a receptacle, in this case an annular cup 23, with a central aperture that extends from the flat body. The term cup is used herein to refer to a receptacle or housing. The central aperture is shaped and sized to mate with the circular arm 29 of the male portion 5. The circular arm 29 of the male portion 5 is inserted into the annular cup 23 of the female portion 7 to form a pivot hinge. An inner surface of the annular cup 23 can articulate along the outer surface of the circular arm 29 allowing the tailgate 2 to pivot about the male portion 5.

Figure 3B:
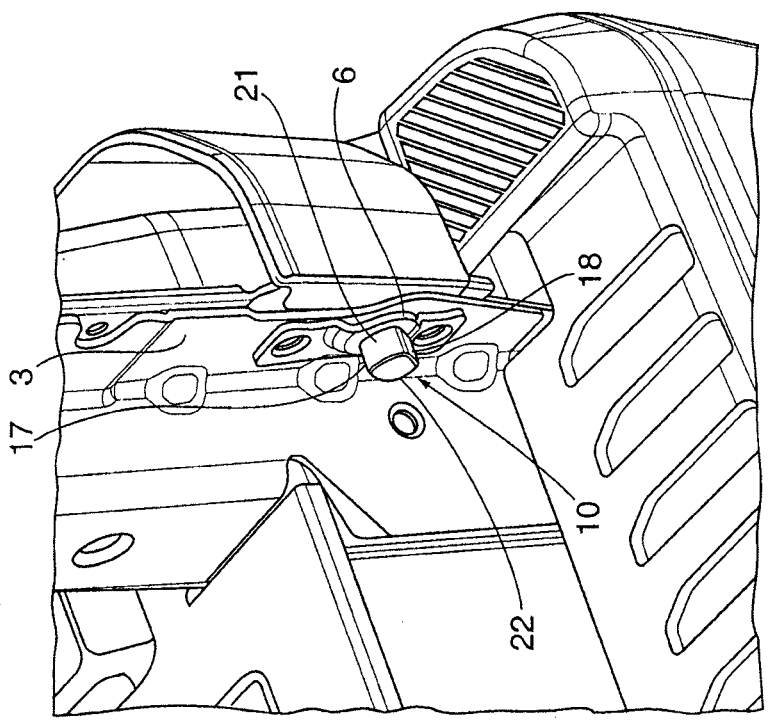

FIG. 3B depicts the male drive portion 6 affixed to the D-pillar 3. The tailgate is not shown in this view. The male drive portion 6 includes a flat body that provides a contact surface with the D-pillar 4. The male drive portion 6 also includes a drive arm 10 that extends away from the flat body.

The drive arm 10 is fixed against the flat body. The drive arm 10 comprises two opposing flat surfaces 17, 18 and two opposing arcuate surfaces 21, 22. FIG. 4B depicts the female drive portion 8 affixed to the opposite outer side wall of the tailgate 2 than the female portion 7. The female drive portion 8 includes a flat body that provides a contact surface with the sidewall of the tailgate 2. The female drive portion 8 includes a drive receptacle, preferably a cup 9 that extends away from the flat body of the female drive portion 8. The drive cup 9 comprises a central aperture defined by two opposing flat surfaces 19, 20 and one arcuate surface 24. The drive cup 9 may also include an open side 25. Preferably the open side 25 is opposite to the arcuate surface 24. The open side 25 is sized to allow the drive arm 10 to slide into and out of the central aperture of the drive cup 9 through a side wall of the drive cup 9.

The two male portions 5, 6 are positioned opposite to each other and they are substantially aligned with each other to form an axis of rotation (shown as line X in FIG. 2).

The control device 11 can be housed within the tailgate 2, as depicted in FIG. 4B. The tailgate 2 can include a hollow chamber in which the control device 11 is inserted into and the control device 11 can be secured to the walls of the chamber or the tailgate 2 directly. The control device 11 comprises a first gear arrangement 13, a second gear arrangement 15 and a motor 12 (as shown in FIG. 5). The drive cup 9 is coupled to the first gear arrangement 13. The first gear arrangement 13 may comprise one or more spur gears, helical gears, bevel gears, spiral bevel gears, worm gears, crown gears, planetary gears and combinations thereof. Preferably, the first gear arrangement 13 comprises an arrangement of spur gears. Rotating the first gear arrangement 13 translates into a rotating movement of the drive cup 9.

The first gear arrangement 13 is coupled with the second gear arrangement 15. The second gear arrangement 15 may comprise one or more spur gears, helical gears, bevel gears, spiral bevel gears, worm gears, crown gears, planetary gears and combinations thereof. Preferably the second gear arrangement 15 is a planetary gear arrangement. The second gear arrangement 15 is operably connected to the motor 12. The motor 12 can be an electrically driven motor such as a DC brush motor, a DC brushless motor, an AC motor, a universal motor or any other suitable electric motor. The motor 12 can receive electric power from the motor vehicle's battery, or other power sources, by an electronic connector 28 (shown in FIG. 2). Optionally, the electronic connector 28 may be reversibly connected with the tailgate 2.

The motor 12 provides a rotational force that rotates the second gear arrangement 15. The second gear arrangement 15 transmits torque to the first gear arrangement 13 and ultimately to the drive cup 9, causing the drive cup 9 to rotate. When the drive cup 9 rotates, the two opposing flat surfaces 19, 20 of the drive cup 9 engage the two opposing flat surfaces 17, 18 of the drive arm 10. The flat surfaces bear against each other and rotate the drive cup 9, which pivots the tailgate 2 about the axis of rotation.

The control device 11 may further comprise a controller 26 that controls the motor 12. The controller 26 can comprise one or more programmable devices such as a processor or microprocessor, a computer, a Field Programmable Gate Array, or a programmable logic controller (PLC). Alternatively or additionally, the controller 26 may comprise one or more non-programmable control elements, such as a timer or pneumatic or electric circuit, capable of implementing a sequence of operations. The controller 26 can receive electronic signals from a user interface (not shown). The user interface can include a switch, a button, a touch screen, a lever and the like. A user may actuate the user interface to send a complete open command to the controller 26. Upon receiving the complete open command from the user interface, the controller 26 sends a controller complete open command to the motor 12. Upon receiving the controller complete open command, the motor 12 rotates and causes the second gear assembly 15 to transmit torque through the first gear assembly 13 to the drive cup 9 and the tailgate 2 opens. Optionally, the user interface is scalable, or proportional, which allows the user to send a scaled open command to the controller 26. Upon receiving a scaled open command, the controller 26 sends a controller scaled open command to the motor 12 which causes the tailgate 2 to move anywhere between the closed position and the open position. The user interface can also be actuated to generate close commands or scaled close commands that result in the motor 12 rotating in the opposite direction and either fully or partially closing the tailgate 2.

The user interface can be located in various positions including within an interior of the pick-up truck, within the truck box 1, on the tailgate 2 and any other convenient location. The electronic connector 28 can also provide a signal path from outside the tailgate 2 to the controller 26 to convey electronic signals from the user interface to the control device 11. For example, the electronic connector 28 can conduct commands from the user interface to the controller 26 including commands to the control device 11 and commands to release a tail gate latch (not shown) for opening the tailgate 2. Optionally, and in combination with other locations, the user interface can also be a wireless remote device, such as an electronic key fob and the like. Preferably, for results of safety, close commands and scaled close commands can only be generated from user interfaces in close proximity to the tailgate 2, for example, on the tailgate 2.

Optionally, anti-pinch measures can be further included in the tailgate 2. Anti-pinch measures can include, for example, ultrasonic sensors, infrared sensors, capacitive sensors, anti-pinch strips and the like. If an anti-pinch measure is engaged, for example if any object is caught between an edge of the tailgate 2 and the truck box 1, the anti-pinch measure will send a pinch stop command to the controller 28. Upon receiving the pinch stop command, the controller 28 will send a controller stop command to the motor 12 to stop the motor 12. Optionally, the motor 12 will also reverse the direction of rotation upon receipt of a controller stop command.

Optionally, an intermediate power switch (not shown) can be provided within the electronic connector 28 or between the electronic connector 28 and the control device 11. The intermediate power switch actuates in response to open and close signals from the controller 26. Actuation of the intermediate power switch controls the supply of electric power, both or one of voltage and current, to the control device 11. The controller 26 can send open and close signals to the intermediate switch at various frequencies and for various durations. For example, the controller 26 may use a pulse-width modulate technique to effect a duty cycle and reduce power loss while providing an adjustable supply of power to the control device 11.

In a further option, the motor 12 can further include a rotary counter such as an encoder or resolver. When the controller 26 receives a complete open or a close command, the controller generates a controller complete open or close command that commands the motor 12 to rotate a pre-set number of times to move the tailgate 2 through the desired range of movement. Upon receiving the controller complete open or close command, the motor 12 will rotate until the pre-set number of rotations is detected by the rotary counter. When the controller 26 receives a scaled open or scaled close command, the controller 26 can compare the scaled command to a pre-set reference chart of a number of motor rotations that moves the tailgate into the position requested by the user. The controller 26 selects the number of motor rotations and sends a controller scaled open or close command to the motor 12 based upon the selected number of motor rotations. Upon receiving the controller scaled open or close command, the motor 12 rotates until the selected number of motor rotations is detected by the rotary counter.

In another variation, the controller 26 can further include an electric current sensor (not shown) so that if the current draw of the motor 12 exceeds an expected current draw, the current sensor will send an override signal to the controller 26, which in turn will send a controller override signal to the motor 12 to stop and reverse the direction of rotation. For example, current over draw can occur when the movement of the tailgate 2 is impeded by an obstacle.

In one variation, the control device 11 further comprises a clutch arrangement 14. The clutch arrangement 14 is positioned between the first and second gear arrangements 13, 15. The clutch arrangement 14 is coupled to the second gear arrangement 15, which acts as a driving gear. The clutch arrangement 14 can engage the first gear arrangement 13, by moving between an engaged position and a disengaged position. When the clutch arrangement 14 is in the engaged position, the first gear arrangement 13 is coupled with, and can be driven by, the second gear arrangement 15. When the clutch arrangement 14 is in the engaged position, the first gear arrangement 13 may be referred to as the driven gear. When the clutch arrangement 14 is in the disengaged position, the first gear arrangement 13 is not driven by the second gear arrangement 15. The clutch arrangement 14 can move between the engaged and disengaged positions based upon an electrical signal from the controller 26. Alternatively, the clutch arrangement 14 can be moved between the engaged and disengaged positions by mechanical, pneumatic or hydraulic means. When in the engaged position, the clutch arrangement 14 engages the first gear arrangement 13 by friction or a form fit and couples the first and second gear arrangements 13, 15.

Figure 6:
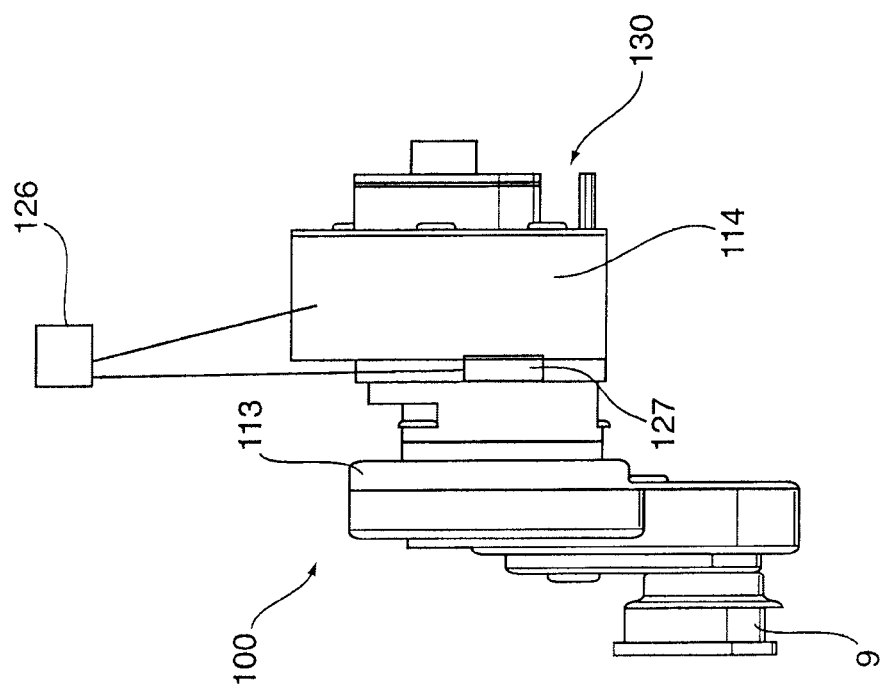
FIG. 6 is an alternative example of a control device for use with the truck box and tailgate of FIG. 1.

The example of FIG. 6 depicts an alternative control device 100. The control device 100 has similar features to the control device 11 described above, except the motor 12 and the second gear assembly 15 are replaced by a brake unit 130. Further, a clutch assembly 114 is positioned between the brake unit 130 and a first gear arrangement 113. The clutch assembly 114 is coupled to the first gear arrangement 113. The clutch arrangement 114 can engage the brake unit 130, by moving between an engaged position and a disengaged position. When the clutch arrangement 114 is in the engaged position, rotation of the first gear arrangement 113 is slowed or stopped by the brake unit 130. When in the engaged position, the clutch arrangement 114 engages the brake unit 130 by friction or a form fit. When the clutch arrangement 114 is in the disengaged position, the first gear arrangement 113 can freely rotate, for example, under manual control of the tailgate 2.

The control device 100 may further comprise an angular motion sensor 127. The angular motion sensor 127 can be positioned within the clutch assembly 114 or within the first gear arrangement 113. The angular motion sensor 127 detects changes in the angular motion while the first gear arrangement 113 is rotating. For example, the angular motion sensor 127 can be a rotational, velocity, acceleration and/or a positional sensor. For example, when the tailgate 2 is being opened or closed, the angular motion sensor 127 detects the rotational velocity of the first gear arrangement 113 as it moves and generates a rotational velocity signal that is sent to a controller 126. The controller 126 may be similar to the controller 26 described above, or not. The controller 126 receives the rotational velocity signal and compares that signal with a pre-set rotational velocity value. If there is a discrepancy between the rotational velocity signal and the pre-set rotational velocity value, a velocity error signal is generated. If the velocity error signal is greater than a pre-set error value, the controller 126 sends a controller engage command to the clutch arrangement 114. When the clutch arrangement 114 receives the controller engage command, it moves into the engaged position and couples the break unit 130 with the first gear arrangement 113 to slow or stop the rotation of the first gear arrangement 113.

Optionally, the controller 126 can send a scaled controller engage command based upon the amplitude of the velocity error signal. Upon receiving a scaled controller engage command, the clutch assembly 114 can move to an intermediary engaged position and slow down the rotational velocity of the first gear assembly 113 by a desired amount.

As a further option, if the tailgate 2 is moving and strikes an obstacle, the angular motion sensor 127 can detect the sudden deceleration of the rotational velocity of the first gear assembly 113. When the angular motion sensor 127 detects a sudden deceleration, a brake signal is generated by the angular motion sensor 127 and sent to the controller 126. When the controller 126 receives a brake signal, it generates a controller engage command that is sent to the clutch assembly 114. When the clutch assembly 114 receives the controller engage command, the clutch assembly 114 moves into the engaged position and the brake unit 130 is coupled with the first gear arrangement 113.

Optionally, when the brake assembly 130 is coupled with the first gear arrangement 113, movement of the first gear arrangement 113 can occur, but preferably only in a direction that is opposite to the direction the first gear assembly 113 was travelling before the brake signal was generated by the angular motion sensor 127. If a brake signal has been sent to the controller 126 and the angular motion sensor 127 detects movement of the tailgate 2 in the opposite direction, the angular motion sensor 127 generates a release signal and sends that release signal to the controller 126. Upon receiving the release signal, the controller 126 generates and sends a controller disengage signal to the clutch arrangement 114. When the clutch arrangement 114 receives the controller disengage signal, the clutch arrangement 114 moves to the disengaged position and the first gear assembly is no longer coupled with the brake unit 130.

Optionally, the clutch arrangement 114 can move between the engaged and disengaged positions based upon an electrical signal received directly from the angular motion sensor 127.

Figure 7:
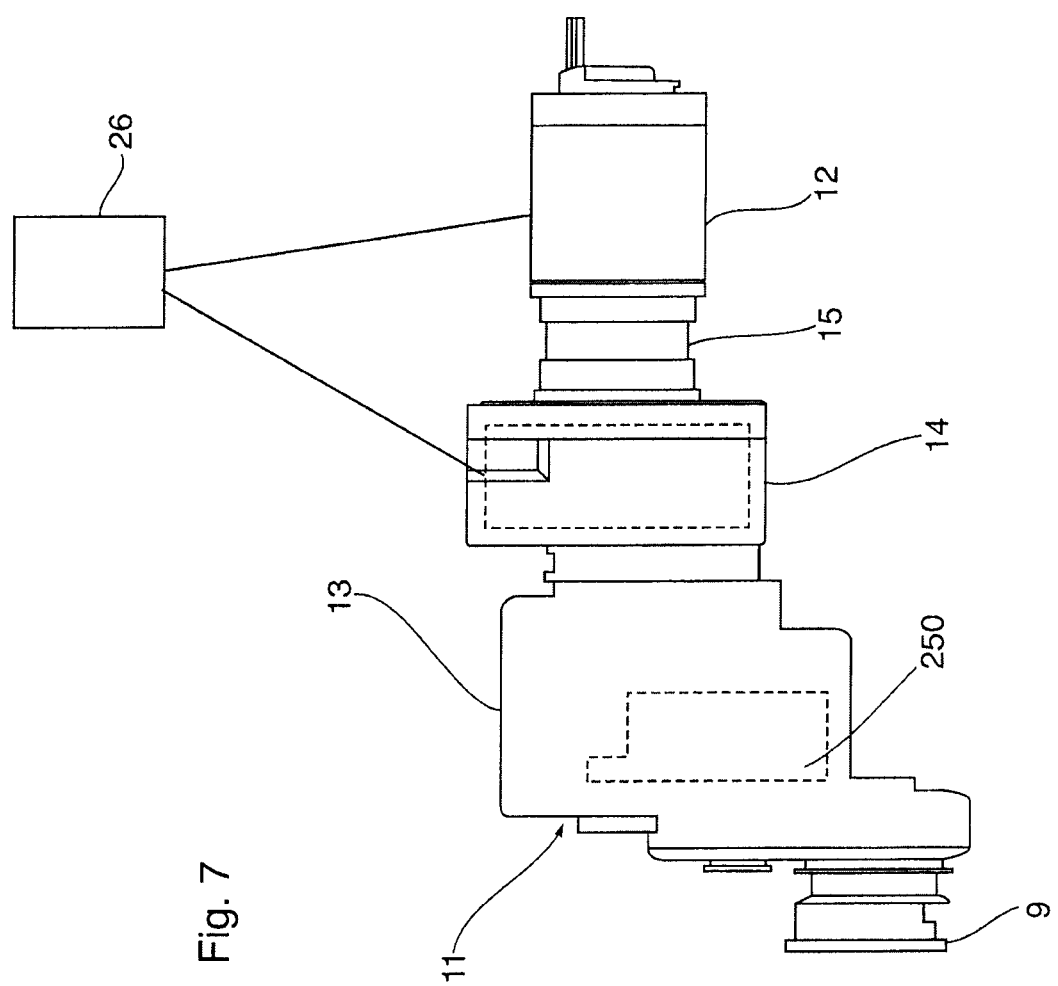
FIG. 7 is a schematic side-view diagram of an example rotary damper for use with the control device of FIG. 5.

As a further option of the control device 11 and the control device 100, a rotary damper 250 may be incorporated to limit, or control, the speed at which the tailgate 2 is opened. FIG. 7 depicts one example of the rotary damper 250 that is positioned within a housing for the first gear arrangement 13 and coupled to the first gear arrangement 13 of the control device 11. Optionally, the rotary damper 250 may be coupled to the first gear arrangement 13 while being positioned outside the housing. While not depicted in the figures, the rotary damper 250 can similarly be positioned and coupled with the first gear arrangement 113 of the control device 100. For example, when the clutch arrangement 14, 114 is in the disengaged position, the tailgate 2 can be opened manually. The rotary damper 250 is coupled to the first gear arrangement 13, 113 to limit the velocity at which the tailgate 2 moves when it is being manually opened. The rotary damper 250 may be directly coupled with one or more gears of the first gear arrangement 13, 113. Optionally, the rotary damper 250 may be indirectly coupled to the first gear arrangement 13, 113, for example, by way of a rack and pinion arrangement or any other suitable arrangement. The rotary damper 250 can limit the opening velocity of the tailgate 2 through the entire swing path of the tailgate 2, between the fully closed and fully opened positions, or through only a portion of the swing path of the tailgate 2. In one option of the rotary damper 250, the rotary damper 250 may comprise an outer fixed body and an inner rotor that rotates within the outer fixed body. The inner rotor is coupled, either directly or indirectly, with one or more gears of the first gear assembly 13, 113. The speed at which the inner rotor rotates within the outer fixed body may be limited by a fluid that is present within the fixed outer body. For example, the fluid can be positioned within a space between the outer fixed body and the inner rotor. The viscosity of the fluid and a damper metering orifice may determine the velocity at which the inner rotor rotates. Optionally, the fluid may comprise silicone. Alternatively, other types of rotary dampers 250 may be used, such as friction based dampers and fluid shear based dampers. Limiting the rate at which the inner rotor rotates will limit the rotational rate of the first gear assembly 13, 113, which in turn will limit the velocity of the tail gate 2 when it is manually opened.

Figure 8:
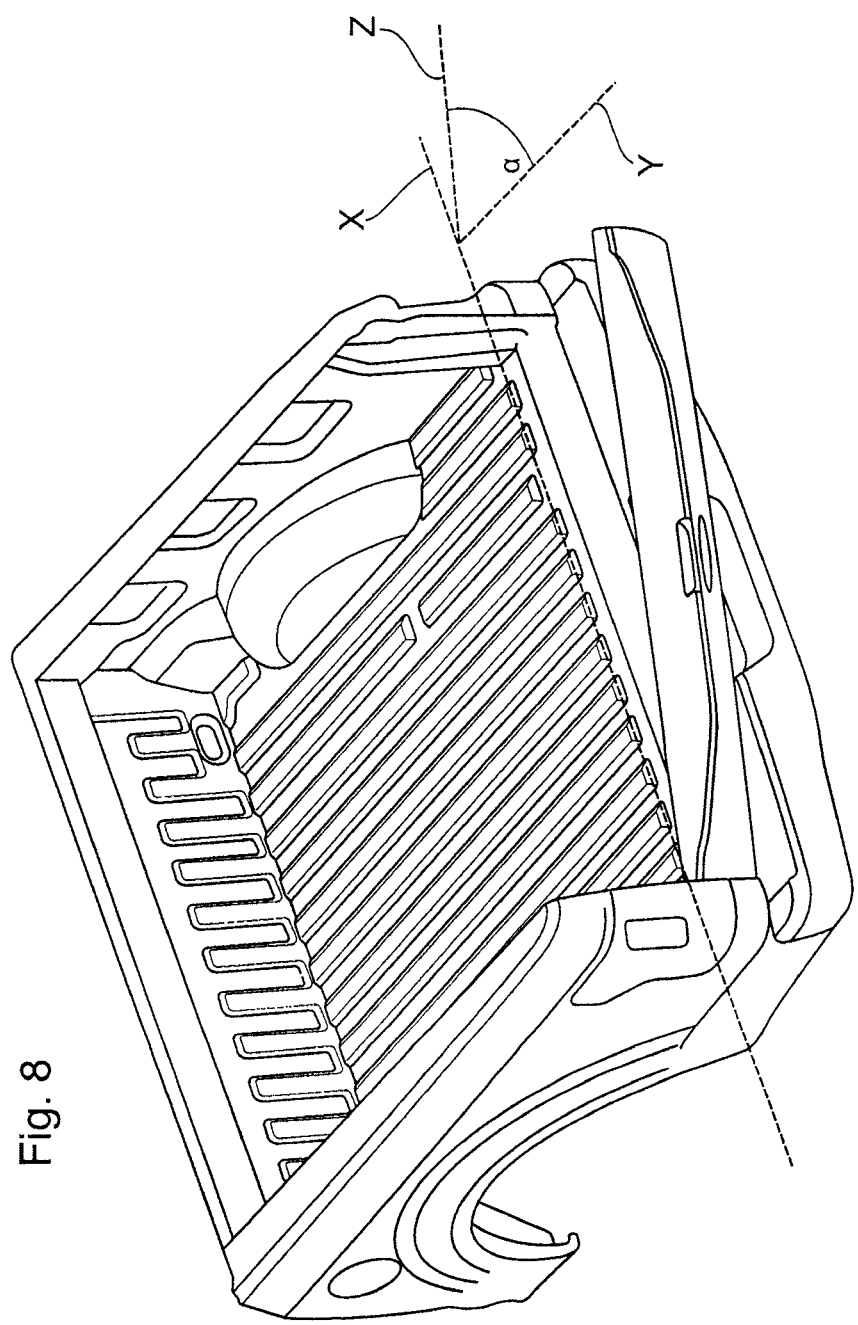
FIG. 8 is a schematic diagram that depicts a removal feature of the tailgate.

As depicted in the example of FIG. 8, the tailgate 2 can be removed from the truck box 1. Rotating the tailgate 2 to a predetermined release angle (shown as a in FIG. 7) relative to the longitudinal axis of the truck box 1 (indicated as line Y in FIG. 7) allows the drive arm 10 to release from the drive cup 9. By exerting a pulling force along the predetermined release angle α (see line Z in FIG. 7), for example a manual pulling force, the drive arm 10 passes through the open side 25. For example, the drive cup 9 may rotate within a non-rotating outer collar 24' with an opening that aligns with the predetermined release angle (see FIG. 4B). When the drive cup 9 is rotated to an angular position other than the predetermined release angle, the outer collar 24' prevents the male drive portion 6 from passing through the opening in the outer collar 24'. When the drive cup 9 is rotated to the predetermined release angle, the male drive portion 6 may pass through the opening in the outer collar 24' and the male drive portion 6 is released. When the male drive portion 6 is released, the tailgate 2 can be shifted laterally parallel to the axis of rotation (shown as line X) to release the circular arm 29 from the annular cup 23 and thus to release the tailgate 2 from the truck box 1. The electrical connector 28 can be disconnected either before or after releasing the drive arm 10 from the drive cup 9.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art.

What is claimed is:
1. A control device for a vehicle tailgate comprising:
   a. a first gear arrangement;
   b. a drive receptacle connected to the first gear arrangement;
   c. a motor;
   d. a second gear arrangement connected to the motor;
   e. a clutch arrangement connected to the second gear arrangement, the clutch arrangement moveable between an engaged position and a disengaged position, such that in the engaged position, the clutch arrangement couples the first gear arrangement with the second gear arrangement and in the disengaged position, the first gear arrangement and the second gear arrangement are not coupled; and
   f. a controller configured to command the motor to rotate the second gear arrangement according to a predetermined number of rotations, the controller comprising an electric current sensor for sending a signal to the motor to stop and reverse the direction of rotation when the current draw of the motor exceeds a pre-set value;
   g. wherein the control device is positionable within the tailgate and the tailgate is reversibly removable from the vehicle when the tailgate is at a predetermined angle of removal.
2. The control device of claim 1, wherein the controller is configured to command the clutch arrangement to move between the engaged position and the disengaged position.
3. The control device of claim 1, further comprising a rotary damper that is coupled with the first gear arrangement, wherein the rotary damper limits a rotational rate of the first gear arrangement when the clutch arrangement is in the disengaged position.
4. A vehicle tailgate comprising a chamber for receiving a control device as claimed in claim 1, wherein the control device is mounted within the chamber.
5. The vehicle tailgate of claim 4, further comprising an electronic connector configured to distribute an electric power supply to the control device.
6. The vehicle tailgate of claim 5, wherein the electronic connector is reversibly connected with the control device and the electronic connector is configured to relay electronic signals from a user interface to the control device.
7. A control device for a vehicle tailgate comprising:
   a. a gear arrangement;
   b. a drive receptacle connected to the gear arrangement, wherein the drive receptacle is releasably connected to a truck box of the vehicle;
   c. a brake unit configured to stop or slow down the movement of the gear arrangement;
   d. a clutch arrangement connected to the gear arrangement, the clutch arrangement moveable between an engaged position and a disengaged position, such that in the engaged position, the clutch arrangement couples the gear arrangement with the brake unit and in the disengaged position, the gear arrangement and the brake unit are not coupled; and
   e. an angular motion sensor configured to detect a change in velocity or direction of the movement of the gear arrangement when the gear arrangement is rotating, and to generate tailgate motion information on the change;
   f. a controller configured to receive the tailgate motion information sent from the angular motion sensor, and to command the clutch arrangement to move between the engaged position and the disengaged position based on the information.

8. The control device of claim 7, further comprising a rotary damper that is coupled with the gear arrangement, wherein the rotary damper limits a rotational rate of the gear arrangement when the clutch arrangement is in the disengaged position.

9. The control device of claim 7, wherein, when the change is a velocity change and exceeds a pre-determined value, the clutch arrangement is placed in the engaged position to couple the brake unit with the gear arrangement, and, when the change is a direction change, the clutch arrangement is placed in the disengaged position to disconnect the brake unit with the gear arrangement.

* * * * *